United States Patent [19]

Förster

[11] 4,327,589

[45] May 4, 1982

[54] FOOT PUMP PRESSURE GAUGE HAVING AN INTEGRATED HOUSING AND CONNECTOR

[75] Inventor: Steffen Förster, Neuenburg, Fed. Rep. of Germany

[73] Assignee: F + R Forster & Rothmann GmbH, Neuenburg, Fed. Rep. of Germany

[21] Appl. No.: 187,017

[22] Filed: Sep. 15, 1980

[30] Foreign Application Priority Data

Jan. 29, 1980 [DE] Fed. Rep. of Germany ... 8002155[U]

[51] Int. Cl.³ .............................................. G01L 7/04
[52] U.S. Cl. ...................................... 73/741; 73/714; 137/557; 137/277
[58] Field of Search ................. 73/741, 742, 743, 756, 73/714; 137/557, 227, 533.11

[56] References Cited

U.S. PATENT DOCUMENTS

| | | | |
|---|---|---|---|
| 1,302,443 | 4/1919 | Shwab | 137/227 |
| 1,915,899 | 6/1933 | Monro et al. | 137/227 |
| 1,927,487 | 9/1933 | Chisholm | 73/756 |
| 3,367,351 | 2/1968 | Smyers, Jr. | 137/557 |

*Primary Examiner*—Donald O. Woodiel
*Attorney, Agent, or Firm*—Pollock, Vande Sande & Priddy

[57] ABSTRACT

A pressure gauge for a foot pump comprises a housing having a connector portion on an exterior wall thereof which is formed integrally with the housing in a one-piece construction. The connector portion of the one-piece construction includes coupling members formed integrally therewith for connection to a foot pump and to a hose, and includes interior bores which define a chamber for a ball check valve and which also communicate the interior of the connector portion with the interior of the housing. The pressure gauge is preferably of the Bourdon-tube type and includes a spring tube which is pressed into a bore that extends from the interior of the connector portion through an adjacent end wall of the housing portion of the one-piece construction.

8 Claims, 1 Drawing Figure

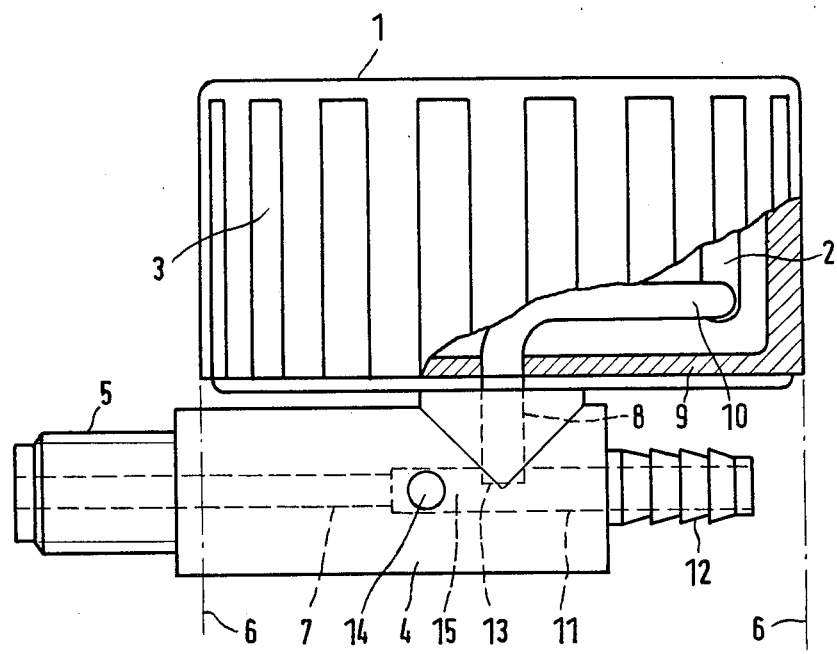

FOOT PUMP PRESSURE GAUGE HAVING AN INTEGRATED HOUSING AND CONNECTOR

BACKGROUND OF THE INVENTION

The present invention relates to an improved pressure gauge construction adapted to be connected to a foot pump and operative to monitor and control the pressure which is generated by such a pump when the pump is employed to inflate tires, rubber boats or the like. Such devices are in themselves well known and typically include a T-shaped fitting which includes a first connector portion adapted to be connected to the foot pump, a second portion adapted to be connected to a pressure gauge mechanism disposed within a separate housing, and a third connector portion adapted to be connected to one end of a hose which is used to inflate the object with which the pump is associated. In practice, the various connector portions are of threaded construction and are arranged so that the T-shaped fitting is screwed onto the foot pump whereafter the pressure gauge and connecting hose can each be screwed onto appropriate portions of the fitting. To accomplish this interconnection of parts, moreover, the housing of the pressure gauge, which is normally formed of a synthetic plastics material, is provided with a threaded element, usually fabricated of brass, which is physically connected to the plastics housing by an injection molding technique.

The foregoing known arrangement is comparatively expensive because of the plurality of parts which are involved, and particularly because of the provision of a brass or metallic connector in association with the plastics housing of the pressure gauge; and the assembly and disassembly of these various parts has been found in practice to be awkward and time consuming.

The principal object of the present invention is to provide an improved pressure gauge arrangement which is far less costly to produce than the arrangements which have been suggested heretofore, and which can be attached to a foot pump and connecting hose more simply and quickly than has been the case heretofore.

SUMMARY OF THE INVENTION

In accordance with the present invention, a housing for a pressure gauge and an associated connector for attaching said gauge to a foot pump and to a connecting hose, are fabricated as a one-piece construction, preferably of a synthetic plastics material. The housing portion of this one-piece construction is preferably of cylindrical configuration and is adapted to support a Bourdon-tube pressure gauge therein, and the connector portion of the one-piece construction comprises a block of cylindrical configuration which is integral with an exterior wall of the housing portion of the construction, preferably with a flat end wall of the cylindrical housing and with the central axis of the cylindrical connector block being oriented substantially at right angles to the central axis of the cylindrical housing portion.

The cylindrical connector block includes a first coupling member at one end thereof, preferably extending beyond the circular contour of the housing portion, for attaching the connector block to a foot pump, and also includes a second connector portion at its other end, preferably located within the cylindrical boundary of the housing portion, for attachment to the connecting hose. The first and second coupling members are formed integrally with the remainder of the block and accordingly comprise portions of the one-piece construction. The interior of the block defines a first elongated bore which extends between the first and second coupling members, a portion of said first bore comprising a chamber having a check ball valve therein, and the interior of the block further defines a second bore which is oriented at right angles to the first bore and which extends from the first bore through the adjacent wall of the housing to communicate the first bore, at a position downstream of the check ball valve, with the interior of the housing. The spring tube forming a portion of the Bourdon-tube pressure gauge includes a connector tube which is press fit into the second bore and which extends from the interior end of the second bore partially into the first bore thereby to define a limit position for movement of the check ball valve.

BRIEF DESCRIPTION OF THE DRAWINGS

The foregoing objects, advantages, construction and operation of the present invention will become more readily apparent from the following description taken together with the accompanying drawing which constitutes a side view of a pressure gauge constructed in accordance with the present invention, a portion of the side wall of the housing being removed to give a clear view of the pressure gauge mechanism within the housing.

DESCRIPTION OF THE PREFERRED EMBODIMENTS

As shown in the drawing, a pressure gauge or manometer 1 comprises a Bourdon-tube, i.e., a spring tube 2 which is located within a housing 3 fabricated of a synthetic plastics material. The spring tube 2 has its free end connected to an index plate (not shown) and operates in known fashion, i.e., pressures which are supplied to one end of spring tube 2 cause the tube to be deformed by the pressure to be measured, with this deformation in turn being indicated by the said index plate to give pressure readings. The housing 3, shown in side view in the drawing, is preferably of cylindrical configuration and comprises a pair of flat end walls at the opposing ends of the cylindrical side walls of the housing, with the calibrated index plate for the pressure gauge being located adjacent the upper flat end wall of the cylindrical housing (as viewed in the drawing).

The housing 3 is formed in one piece with a connector 4 comprising an elongated cylindrical block which is attached integrally to the other flat end wall of the housing 3, with the central axis of the connector block 4 oriented substantially at right angles to the central axis of the cylindrical housing 3. Connector block 4 is provided with a first coupling member 5 at one end thereof adapted to be screw connected to the foot pump with which the pressure of the present invention is to be associated, the coupling member 5 being provided with a threaded exterior configuration for this purpose. Coupling member 5 is integral with block 4, and therefore with housing 3, and is so disposed that it protrudes outwardly beyond the extended circular contour 6 of housing 3 as illustrated in the drawing. The other end of connector block 4 is provided with another coupling member 12, again formed integrally with block 4, for connection to a hose which is forced over the exterior of coupling member 12, and coupling member 12 is preferably disposed within the extended contour 6 of the housing 3 as depicted in the drawing.

Connector block 4 has an interior bore 7 which extends therethrough between coupling members 5 and 12, with a portion 11 of this bore being of larger diameter than the remainder of the bore; and the interior of the block 4 defines a second bore 8 which branches at right angles from bore 7, 11 and which extends through a comparatively short cylindrical member located between the exterior of block 4 and the adjacent flat end wall of housing 3 (the connector portion of the pump construction accordingly being substantially T-shaped as illustrated in the drawing) through the floor 9 of housing 3. The spring tube 2 has its pressure input end coupled to the connector block by means of the connector tube 10 which is press fit through the floor 9 of the housing and through bore 8 to an extent such that the free end 13 of the connector tube 10 protrudes partially into the larger diameter portion 11 of bore 7 at a position downstream of the junction between the larger and smaller diameter portions of bore 7. To rigidify the structure, the connector tube 10 can be joined to the walls of bore 8 by gluing, or by known ultrasonic or high frequency techniques.

A check ball valve, comprising a ball 14 whose diameter is greater than the smaller diameter portion of bore 7 and larger than the larger diameter portion 11 of said bore, is located in a chamber 15 which comprises that portion of larger diameter bore 11 between the protruding end 13 of tube 10 and the junction of the larger and smaller diameter portions of bore 7. The protruding end 13 of tube 10 accordingly defines a limit position to which ball 14 can move away from the shoulder between the larger and smaller diameter portions of bore 7, toward coupling member 12.

Pressure gauge structures suggested heretofore have employed check ball valves such as ball 14, but the ball in prior structures is usually located in a chamber which is connected by a bore that leads to the pressure gauge itself, the overall arrangement being such that the ball valve can fall out of this connecting bore when the fitting or coupling is not actually connected to the pressure gauge or manometer. This disadvantage is obviated by the novel bore configuration described above and illustrated in the drawing.

Inasmuch as the manometer 1 of the present invention comprises an integrated housing 3, connector block 4 and coupling members 5 and 12, all of one-piece plastics construction with the associated bores 7, 8 and 11 formed therein, the integrated structure can be produced in a single operation, involves the production of far fewer parts than has been considered necessary heretofore, and eliminates the parts previously considered necessary to effect screw connection between the fitting and the connecting hose, and also eliminates the composite plastic/brass construction which has typically been employed heretofore to effect connection between the manometer housing and the associated connector or fitting. The overall structure of the present invention can, moreover, be attached to the foot pump and connecting hose far more simply than in the prior art. The coupling member 5 is simply screwed into place on the foot pump thereby to connect the unitary manometer 1 to the foot pump, and one end of the connecting hose is slipped over coupling member 12 and is retained in place thereon by the toothed exterior configuration of member 12 as shown in the drawings.

Having thus described my invention I claim:

1. A pressure gauge for a foot pump comprising a hollow cylindrical housing having an end wall, a pressure gauge mechanism disposed within said housing, and a connector located on the exterior side of said end wall of said housing, said connector comprising an elongated cylindrical block whose central axis is oriented substantially at right angles to the central axis of said cylindrical housing, said block having a first coupling member at one end thereof for coupling said housing and gauge mechanism to a foot pump, and having a second coupling member at the other end thereof for coupling said housing and gauge mechanism to a hose, the interior of said block defining a first bore communicating with and extending between said first and second coupling members, and the interior of said block further defining a second bore communicating with said first bore and extending transversely to said first bore through said end wall of said housing to the interior of said housing for connection to said pressure gauge mechanism, said block including a comparatively short cylindrical portion extending outwardly of the exterior cylindrical wall of said block along an axis at right angles to the axis of said cylindrical block for joining said cylindrical block to said end wall of said housing, whereby said connector block is of substantially T-configuration and has its exterior cylindrical wall spaced from the said end wall of said housing by said comparatively short cylindrical portion therebetween, said second bore extending through said comparatively short cylindrical portion in coaxial relation therewith, said housing, connector block and first and second coupling members all being formed integrally with one another in a one-piece construction.

2. The pressure gauge of claim 1 wherein said housing, connector block, and first and second coupling members comprise portions of a unitary plastics construction.

3. The pressure gauge of claims 1 or 2 wherein said pressure gauge mechanism includes a spring tube which is adapted to be elastically deformed by a pressure to be measured, said spring tube including a tubular connecting element which is disposed in and joined to the walls of said second bore.

4. The pressure gauge of claim 3 wherein said first bore defines a chamber having a check ball valve therein.

5. The pressure gauge of claim 4 wherein said first bore includes a first portion of first diameter extending from said first coupling member toward said second bore, and a second portion having a diameter larger than that of said first portion and extending from the interior end of said first portion past said second bore to said second coupling member, said check ball valve comprising a ball having a diameter greater than said first diameter and smaller than said second diameter, said ball being located in said second larger diameter portion of said first bore adjacent the junction of said first and second portions of said first bore, said tubular connecting element including a portion which protrudes from said second bore partially into the second portion of said first bore at a location downstream of the junction of said first and second portions of said first bore to define a limit position for movement of said all away from said junction of said first and second portions of said first bore.

6. The pressure gauge of claims 1 or 2 wherein said first coupling member includes a threaded exterior surface adapted to screw connect said pressure gauge to the foot pump, and said first coupling member extends from said one end of said block to a position beyond the region defined by extension of the outer circular periphery of said housing.

7. The pressure gauge of claim 6 wherein said second coupling member is located within the region defined by extension of the outer circular periphery of said housing.

8. The pressure gauge of claim 1 wherein said pressure gauge mechanism is a Bourdon-tube gauge having a spring tube which is connected from the interior of said housing to the said first bore in said connector block via said second bore in said connector block.

* * * * *